Figure 1:
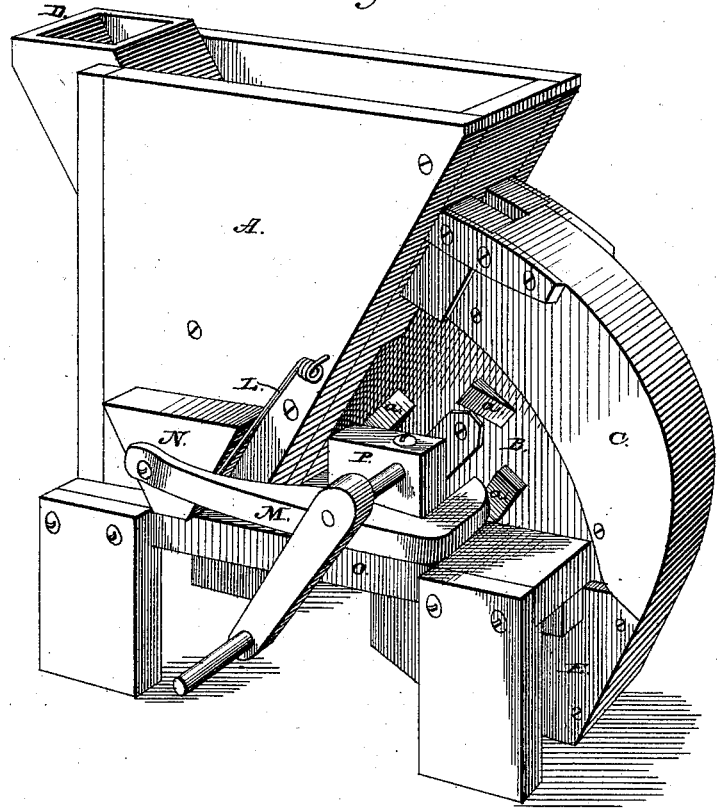
Figure 2:
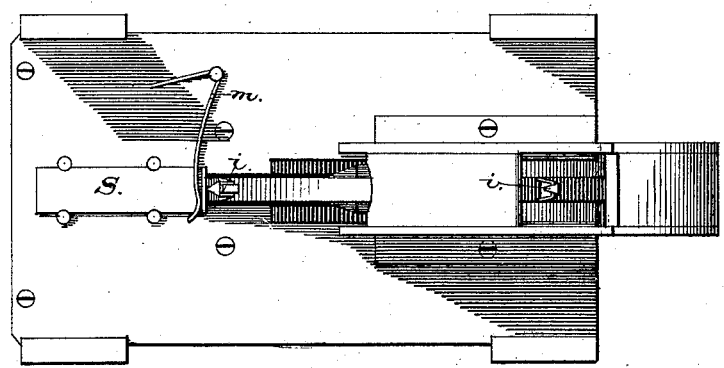
Figure 3:
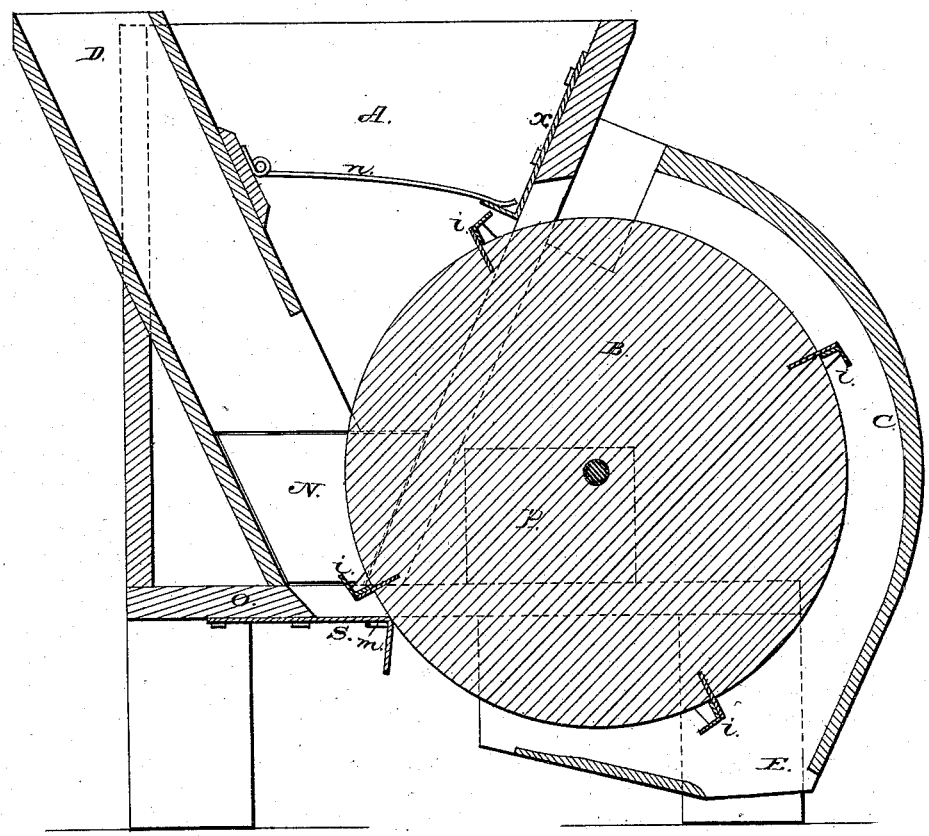

2 Sheets—Sheet 1.

P. TRAYSER.
Cotton-Seed Planter.

No. 197,953. Patented Dec. 11, 1877.

Attest:
John C. Dennis
Wm J Dennis

Inventor.
Paul Trayser

2 Sheets—Sheet 2.

P. TRAYSER.
Cotton-Seed Planter.

No. 197,953. Patented Dec. 11, 1877.

Attest:
John C Dennis
Wm F Dennis

Inventor:
Paul Trayser.

UNITED STATES PATENT OFFICE.

PAUL TRAYSER, OF RICHMOND, INDIANA, ASSIGNOR OF ONE-HALF HIS RIGHT TO WAYNE AGRICULTURAL COMPANY, OF SAME PLACE.

IMPROVEMENT IN COTTON-SEED PLANTERS.

Specification forming part of Letters Patent No. 197,953, dated December 11, 1877; application filed July 3, 1877.

*To all whom it may concern:*

Be it known that I, PAUL TRAYSER, of Richmond, Wayne county, Indiana, have invented certain new and useful Improvements in Cotton-Seed Planters; and I hereby declare the following to be a full, clear, and exact description of the same.

The object of my invention is to produce an equal, uniform, and positive delivery of cotton-seed into the tube of the hoe of the planter in the original fuzzy or woolly state of the seed.

The nature of my invention consists in a wheel to be propelled by the traction of the ground or driving wheel of an ordinary planter, having on its periphery a series of cups or buckets of peculiar construction, which, in their revolution, pass upward through the bottom of a hopper or receptacle for the seed, and in the employment of vibrating side pieces, which constitute the sides of the lower portion of said hopper. The said vibrating sides are given a reciprocal movement by means of curved arms pivoted to the framing, and receive their motion from wedge-shaped cams secured to the outer surface of the feed-wheel.

To enable those skilled in the art to make and use my said improvement, I will proceed to describe the same.

A is an ordinarily-constructed hopper, and B is a wheel made to revolve in such a manner that a portion of its circumference passes through the lower portion of said hopper A. Upon the periphery of the wheel B are placed buckets or cups of a peculiar construction, for the purpose of taking up and carrying over and forward the seed with which they are brought in contact in the bottom of the hopper. A hood or circular casing, C, protects the upper surface of the wheel B during its motion in conveying the seed by means of the cups or buckets to the delivery-spout E. The wheel B is provided with wedge-shaped cams $a\ a\ a\ a$ on its outer surface, which, by the revolution of the wheel, actuate and operate curved levers M M, to which are secured the movable sides of the bottom of the hopper A, and marked N N. A spring, L, completes the full backward and forward movement of the vibrating sides N N. The bottom piece O is mortised to allow the revolution of the wheel B, and has attached to its lower surface a slide, S, which, while forming the bottom of a cavity in the lower portion of the hopper A, is operated by the cups or buckets $i\ i\ i$, to allow of their passage upward, and is restored by a spring, $m$, to its original position. The front side of the inner portion of the hopper A is provided with a similar slide, X, which operates to regulate the amount of seed carried by the cups or buckets, and also to prevent waste from the hopper. The slide X is also provided with a spring, $n$, to produce the return motion. P P are pillow-blocks to support the journal of the wheel, and are secured to the bottom piece O.

The operation of my invention is substantially as follows: The cotton-seed in its normal condition is presented to the auxiliary spout D, from thence to the bottom of the hopper A, where it is alternately compressed and released by the action of the devices N N, during which time the cups or buckets $i\ i\ i$, passing through the hopper upward, are successively filled, and the seed is carried to the point of delivery by a forced and positive movement of the devices herein described.

There is no particular kind of hoe or feeding-tube contemplated in my invention, as any of those ordinarily constructed will plant the seed when properly and regularly delivered.

My device may be attached by any of the well-known methods to the driving apparatus of an ordinary single-row drill, or by two or more being operated at the same time by a single shaft, as may be desired.

Having thus fully described my said invention, what I claim as new, and desire to secure by Letters Patent, is—

1. The hopper A, constructed with the movable side pieces N N, operating in the manner herein set forth.

2. The wheel B, the cups $i\ i\ i\ i$, and cams $a\ a\ a\ a$, constructed and operating as herein described.

3. The combination and arrangement of the wheel B, cams $a\ a\ a\ a$, cups $i\ i\ i\ i$, curved arms M M, and side pieces N N, all arranged and operating in the manner and for the purpose as herein described.

PAUL TRAYSER.

Witnesses:
JOHN C. DENNIS,
WM. F. DENNIS.